US010867509B2

(12) United States Patent
Moustafa et al.

(10) Patent No.: US 10,867,509 B2
(45) Date of Patent: Dec. 15, 2020

(54) INFORMATION CENTRIC NETWORK HIGH DEFINITION MAP DISTRIBUTION (71) Applicant: Intel Corporation, Santa Clara, CA (US)

(72) Inventors: Hassnaa Moustafa, Portland, OR (US); Eve M. Schooler, Portola Valley, CA (US); Maruti Gupta Hyde, Portland, OR (US); Jeffrey Christopher Sedayao, San Jose, CA (US); Ned M. Smith, Beaverton, OR (US); S M Iftekharul Alam, Hillsboro, OR (US); Satish Chandra Jha, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/456,716

(22) Filed: Jun. 28, 2019

(65) Prior Publication Data
US 2019/0325737 A1    Oct. 24, 2019

(51) Int. Cl.
G08G 1/01        (2006.01)
H04L 29/08       (2006.01)
H04W 4/46        (2018.01)
H04W 4/38        (2018.01)
G08G 1/0967      (2006.01)
H04W 4/44        (2018.01)

(52) U.S. Cl.
CPC ..... *G08G 1/0112* (2013.01); *G08G 1/096791* (2013.01); *H04L 67/10* (2013.01); *H04L 67/12* (2013.01); *H04W 4/38* (2018.02); *H04W 4/44* (2018.02); *H04W 4/46* (2018.02)

(58) Field of Classification Search
CPC . G08G 1/0112; G08G 1/096791; H04W 4/38; H04W 4/46; H04W 4/44; H04L 67/10; H04L 67/12
USPC .......................................... 709/217
See application file for complete search history.

(56) References Cited

PUBLICATIONS

RFC7476, Information-Centric Networking: Baseline Scenarios, Internet Research Task Force (IRTF), Mar. 2015 (Year: 2015).*
Y. Yu, X. Li, M. Gerla and M. Y. Sanadidi, "Scalable VANET content routing using hierarchical bloom filters," 2013 9th International Wireless Communications and Mobile Computing Conference (IWCMC), Sardinia, 2013, pp. 1629-1634. (Year: 2013).*
"The Mapping Challenge", Road Experience Management [Online]. Retrieved from the Internet: URL: https: www.mobileye.com our-technology rem , (2018), 4 pgs.
"HD Maps for Autonomous Driving and Driver Assistance", [Online]. Retrieved from the Internet: URL: https: www.here.com products automotive hd-maps, (2019), 7 pgs.

(Continued)

Primary Examiner — Nicholas R Taylor
Assistant Examiner — Chong G Kim
(74) Attorney, Agent, or Firm — Schwegman Lundberg & Woessner, P.A.

(57) ABSTRACT

Systems and techniques for information centric network (ICN) high definition (HD) map distribution are described herein. For example, a vehicle may detect a map tile event (e.g., moving into an area for which the vehicle does not have an up-to-date map tile). The vehicle may transmit an interest packet a name for the map tile via an ICN and receiving the map tile in a data packet sent in response to the interest packet.

24 Claims, 8 Drawing Sheets

(56) References Cited

PUBLICATIONS

"Build apps with Here Maps API and SDK Platform Access", [Online]. Retrieved from the Internet: URL: https: developer.here.com , (2019), 4 pgs.

Venkataramani, A, "Design Requirements for a Global Name Service for a Mobility-Centric, Trustworthy Internetwork", IEEE 2013 Fifth International Conference on Communication Systems and Networks (COMSNETS), (2013), 9 pgs.

* cited by examiner

INFORMATION CENTRIC NETWORK HIGH DEFINITION MAP DISTRIBUTION

TECHNICAL FIELD

Embodiments described herein generally relate to computer networking and more specifically to information centric network (ICN) high definition (HD) map distribution.

BACKGROUND

ICN is an umbrella term for a new networking paradigm in which information itself is named and requested from the network instead of hosts (e.g., machines that provide information). To get content, a device requests named content from the network itself. The content request may be called an interest and transmitted via an interest packet. As the interest packet traverses network devices (e.g., routers), a record of the interest is kept. When a device that has content matching the name in the interest is encountered, that device may send a data packet in response to the interest packet. Typically, the data packet is tracked back through the network to the source by following the traces of the interest left in the network devices.

Autonomous driving (AD) refers to sensors and controls on vehicles to move the vehicle without intervention by a person. A similar set of technologies may assist the driver, taking responsibility for some aspects of vehicle control, such as staying in a lane, adaptive cruise control, etc. For either AD or driver assist (e.g., assisted vehicle driving), the vehicle includes sensors—e.g., camera, lidar, ultrasonic, etc.—to sense the environment, communications to connect to other vehicles or infrastructure—e.g., vehicle-to-vehicle (V2V) networks, vehicle-to-everything (V2X) networks, cellular connectivity, etc.—and processing power to tie it all together.

Digital maps are often stored and distributed to devices as tiles. Tiling the maps enables relatively small sections of a map to be provided on an as-needed basis, reducing device storage requirements, and easing the burden on the network by reducing how much of the map is transmitted at any given time. HD maps generally refer to maps with tiles at a resolution sufficient for autonomous or assisted vehicle driving. Here, the tile is a sub-unit of map designed for progressive acquisition (e.g., downloading), such as by a vehicle while traveling on a road.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

HD map are becoming more important in AD implementations, being considered an extended sensor to sense the surrounding environment in real-time. Generally, HD map delivery involves a centralized car-to-cloud for both crowdsourcing—e.g., generation or update of HD map tiles by a vehicle with subsequent sharing to other vehicles—and distribution. In some examples, content delivery networks (CDNs) may be employed to help push content from the Cloud.

Such a centralized design may encounter some issues. For example, retrieving content from the cloud for every request may not be an efficient approach resulting in a failure to provide map tiles in real-time on occasion. Also, separating crowdsourcing and distribution makes building the HD maps tiles a heavy lifting process. Because crowdsourcing is generally done by vehicles without consideration as to how HD map tiles are built or updated in the cloud and distributed by a CDN, the work done by the vehicles is generally subject to translation or transformation before it may be used by the cloud and distributed to other vehicles.

To address these issues, an ICN may be used to distribute crowdsourced HD map tiles among vehicles. Here, the crowdsourcing operation is expanded to a name-based model. Also, the CDN distribution model may be expanded to enable vehicles to participate in map tile distribution to other vehicles. Applying ICN in HD maps adds efficiency, reliability, and better performance to the current HD map building and tile distribution. Further, ICN provides an enhanced distribution network among vehicles, changing it from a cloud-based only model and expanding the distribution of tiles to take place by vehicles in addition to clouds. Authentication of crowdsourced map information has lower bandwidth costs compared to a cloud-based map solution. Moreover, named-storage and distribution for HD map tiles helps to enable several services that operate on the map tiles, with the services themselves possibly being better disseminated based on named requests. Additional details and examples are provided below.

Figure 1:
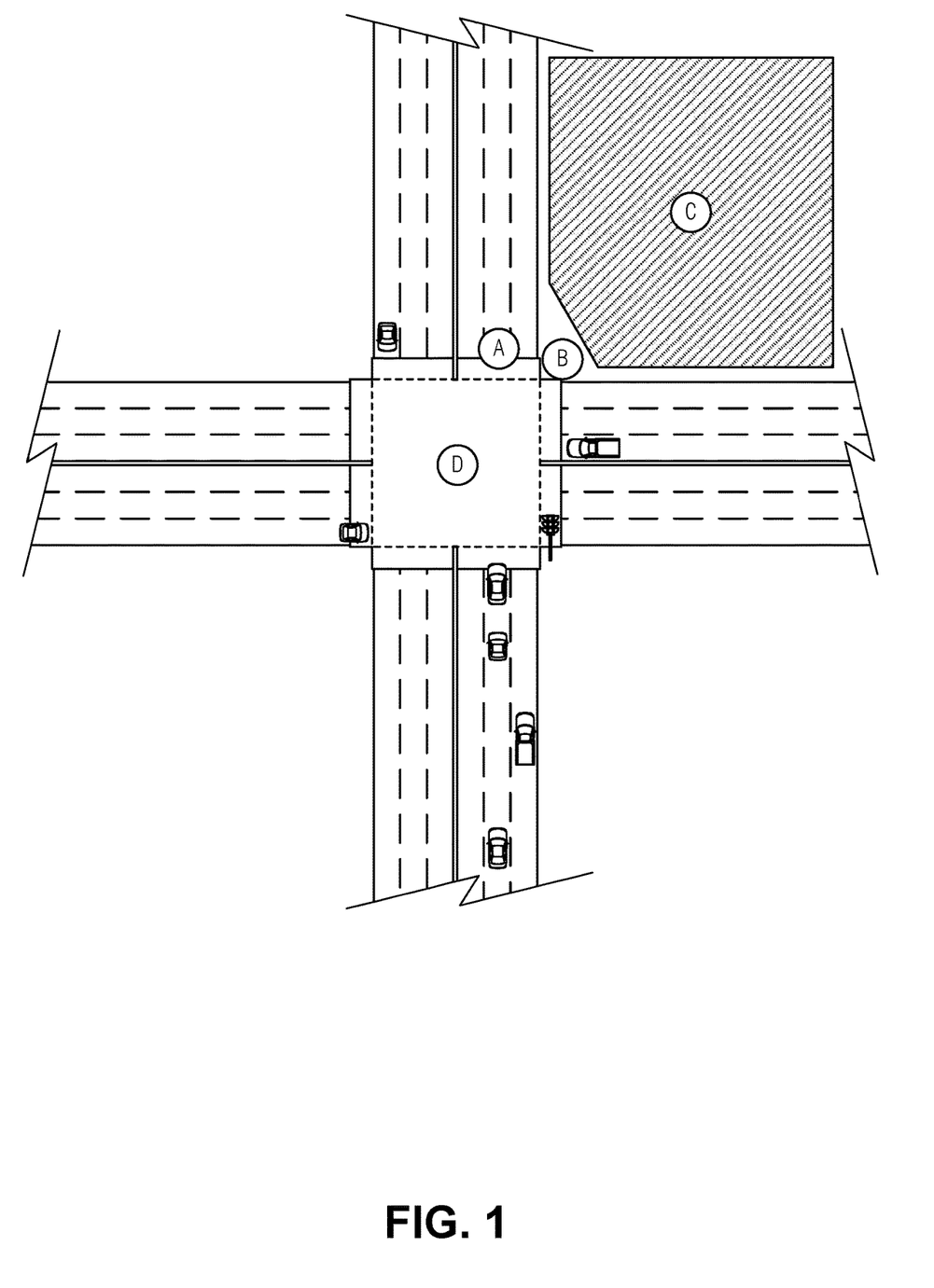
FIG. 1 illustrates overview of HD map tile information, according to an embodiment.

FIG. 1 illustrates overview of HD map tile information, according to an embodiment. Generally, the examples given below focus on enhancing or expanding current HD map systems leveraged by connected and autonomous vehicles to make them more efficient, better able to handle real-time events, or distribute additional services to vehicles on top of the HD maps. To this end, the overview provided in FIG. 1 gives context to the systems and techniques described later.

HD maps generally provide real-time information on each road segment with very high precision—e.g., resolution of features, such as road edges, lane markings, or road hazards, down to the nearest inch. HD maps generally differ from traditional navigation maps in several ways. For example, HD maps often have three layers. One of these layers is a map layer. The map layer provides a sub-lane level representation of the road network and may include slope, curvature, lane marking types, roadside objects etc. The map layer is designed for positioning, localization, or automated maneuvering. As illustrated in FIG. 1, the elements A-D demonstrate map layer components of lane markings 'A', a road edge 'B', a parking geofence 'C', and an intersection 'D'.

The second HD map layer is an Activity Layer. The Activity Layer tracks dynamic events as they happen. Such events may include traffic conditions or warnings about road hazards. The Activity Layer thus provides near real-time visibility of the expanded road network, generally beyond the range of vehicle sensors.

The third HD map layer is an Analytics Layer. This layer performs the perception of deltas (e.g., variations) between the vehicle's sensors and what is provided by other layers of the HD map. In an example, the Activity Layer provides analysis on long-term location-based driver behavior data for a road segment. This analysis may be used to, for example, compute speed profiles for a highly automated vehicle.

Figure 2:
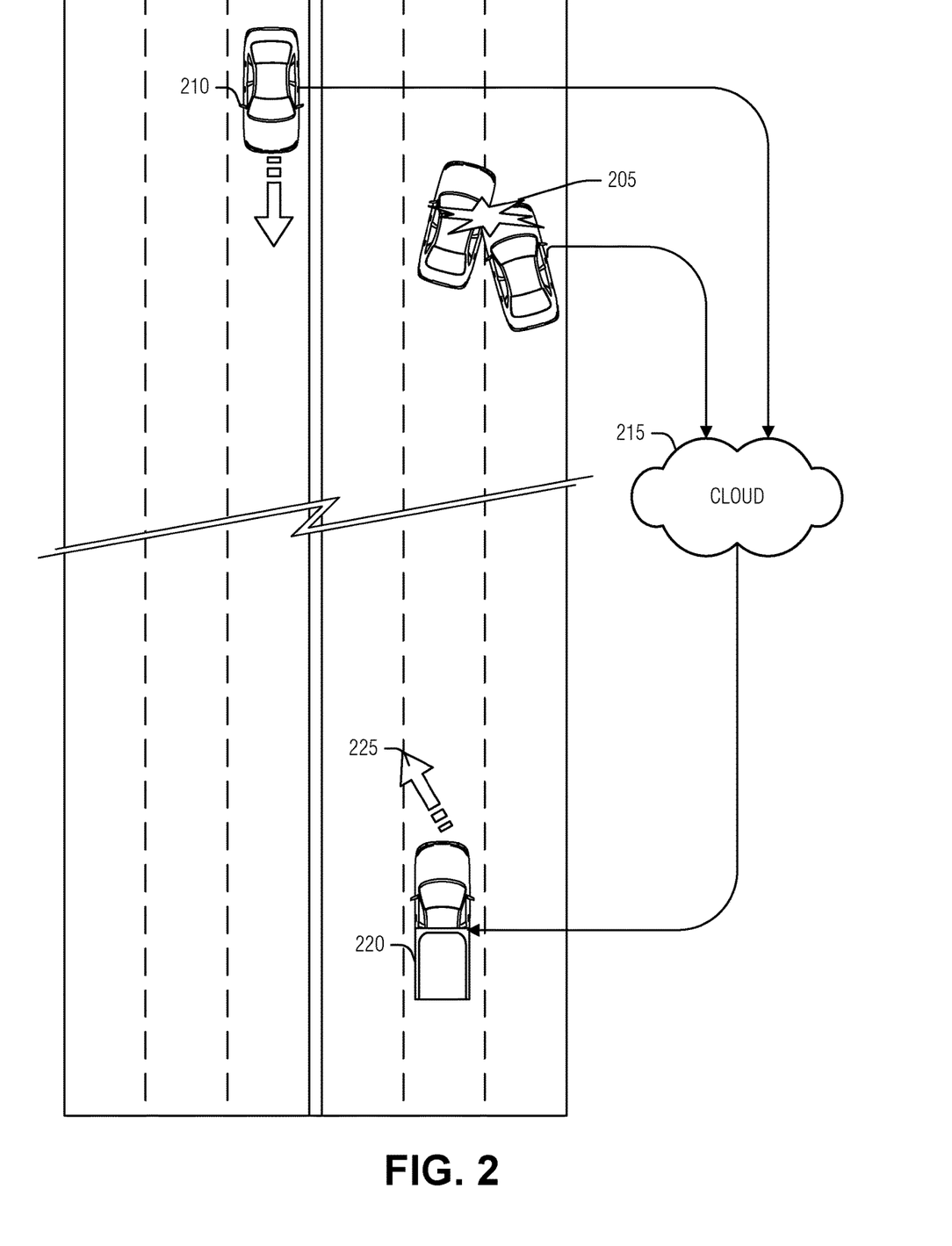
FIG. 2 is an example of real-time crowdsourcing of HD map tiles, according to an embodiment.

FIG. 2 is an example of real-time crowdsourcing of HD map tiles, according to an embodiment. The illustrated scenario involves a wreck 205 that is observed by another vehicle 210. Data from the wreck 205 and the other vehicle 210 are transmitted to the cloud 215. Upon a map refresh from the cloud 215, a truck 220 notes the wreck 205 in the updated HD map tile and changes course 225 to avoid the wreck 205.

The scenario generally follows a cloud-centric HD map distribution process where an HD maps client in the truck 220 continuously communicates with the HD maps application server hosted in the cloud 215. Light detection and ranging (LiDAR) data or imagery data from cameras (e.g., on the truck 220, other vehicle 210, etc.) are leveraged to create high-precision 3D base-maps during map building and refresh. HD maps are distributed to vehicles in the form of tiles that are progressively downloaded from cloud 215 to vehicles. Generally, each tile covers a few (e.g., two) kilometers by a few kilometers. HD map tile refreshes generally follow the opposite path, from vehicle to cloud 215.

Figure 3:
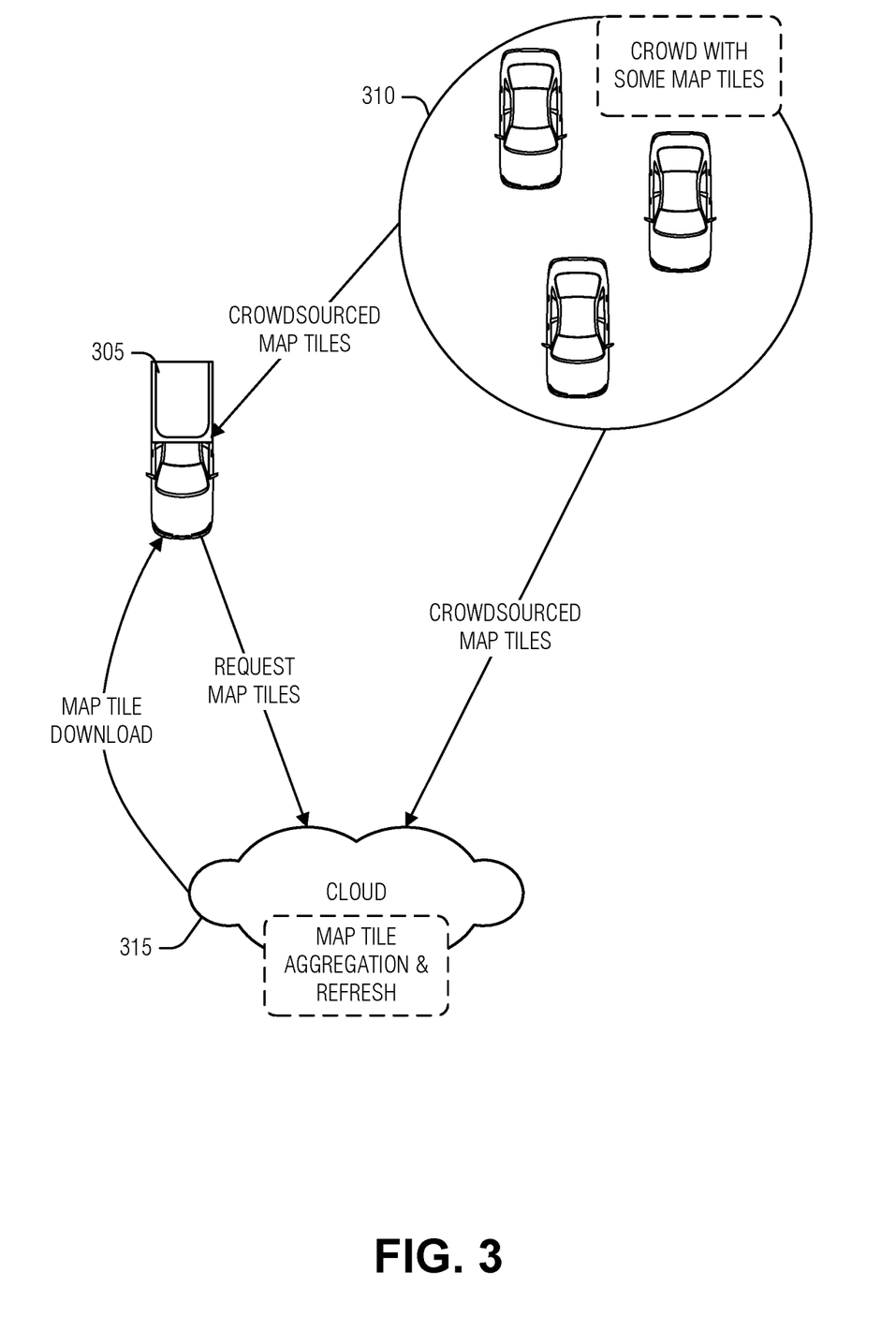
FIG. 3 illustrates an example of HD map tile delivery, according to an embodiment.

FIG. 3 illustrates an example of HD map tile delivery, according to an embodiment. HD maps with full dependence on the cloud 315 tend to operate as follows. Vehicles 310 equipped with sensors (e.g., cameras, LiDAR, ultrasonic, etc.) perform measurements of road data. The vehicles 310 then transmit this road data, which may include data about the driving path's geometry or stationary landmarks around each vehicle 310, to the cloud 315. The cloud 315 uses the data from the vehicles 310 to build the HD map tiles to cover the geographic area.

A vehicle 305 may consume HD maps by downloading map tiles from the cloud 315 every few kilometers of road segment. The vehicle 305 may then analyze the map-relevant information in real-time to note any differences with what the vehicle 305 is crowdsourcing. If any difference is detected—such as a new object scene that is not found in the corresponding tile—the difference is compressed (e.g., to facilitate transmission and network bandwidth usage) and is sent to the cloud 315.

ICN brings features that are very useful to HD maps coverage and distribution. As noted above, ICN leverages named data, which nicely captures and exposes an HD map vector tile format's description of the content. Further, from a connectivity perspective, ICN is generally more resilient to intermittent connectivity and is transparent to the underlying radio access technology. This may enable vehicles to download HD maps tiles independent of their connectivity type. Also, as ICN is transparent to the underlying connectivity, vehicles are not constrained to only using one type of connectivity but may pick the connectivity type based on the link quality for each connectivity type (radio technology) in the vehicle. Continuing this vein of flexible connectivity, because ICN does not rely on point-to-point addressing, ICN has native support for anycast, multicast, and broadcast. Thus, the vehicle 305 may receive tiles from the cloud 315 or from the other vehicles 310 without any special consideration. Thus, ICN enables efficient HD map distribution to vehicles in each road segment. Further, the in-network caching support in ICN enables efficient HD map tile distribution from the edge and also among vehicles.

Figure 4:
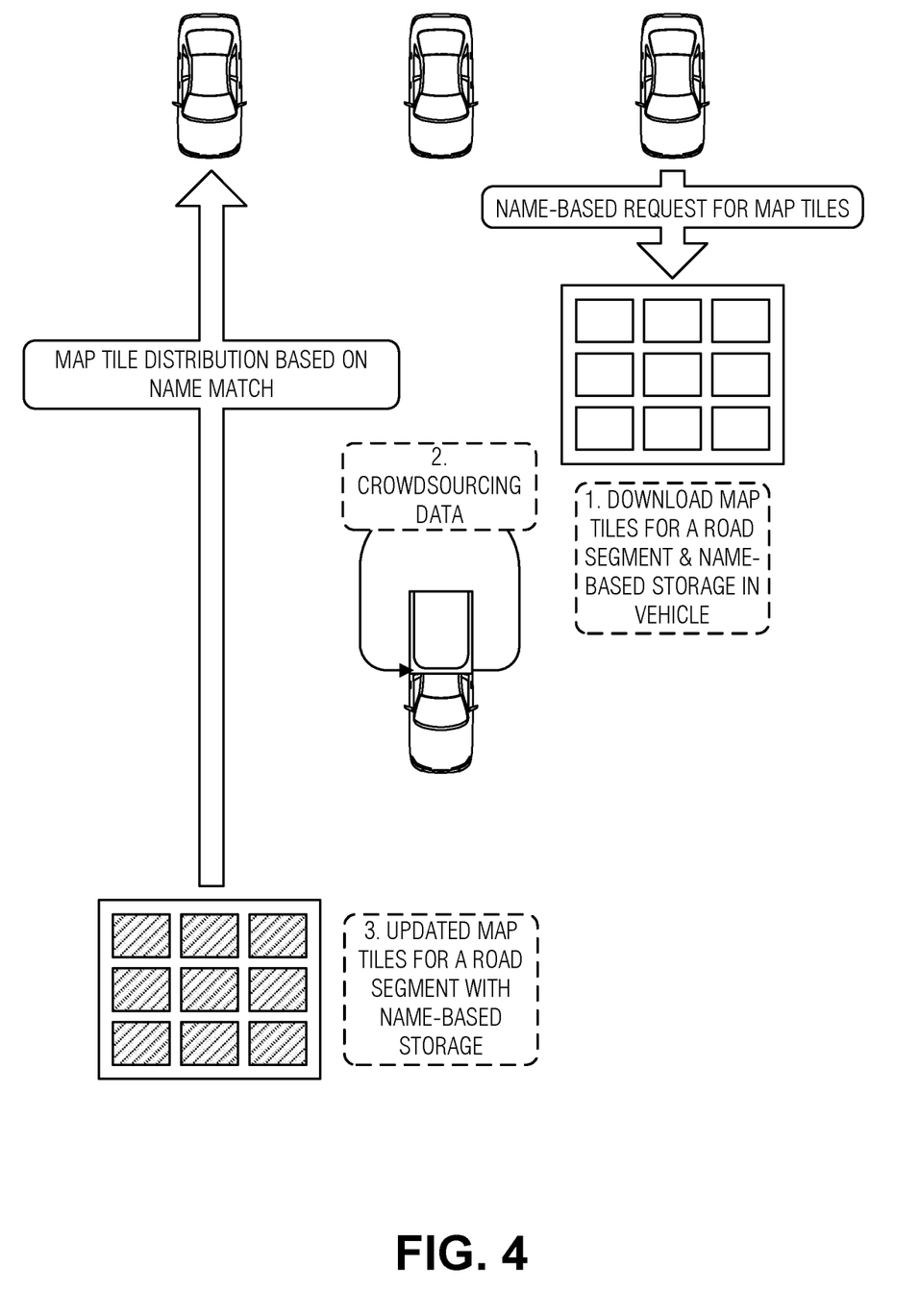
FIG. 4 is an example of using ICN to deliver HD map tiles, according to an embodiment.

FIG. 4 is an example of using ICN to deliver HD map tiles, according to an embodiment. In both crowdsourcing and consumption of HD map tiles, data sizes tend to be small in both the uplink and the downlink. However, it may be challenging to meet real-time guarantees numerous round-trip communications between a vehicle and the cloud. Also, using the cloud results in very regional information (e.g., tile and layers for a particular road segment) continually being transmitted across the world. This may not only lead to inefficiencies in terms of data transfer, but some data may quickly be out-of-date. For example, if a traffic officer is helping circulation at an intersection or if a school bus stops, these are very time-limited events that do not need to refresh tiles in the cloud and are better shared regionally. The cloud-based solution also largely relies on strong infrastructure support (e.g., dense deployment of road side units). Enabling vehicles to share HD map tiles among them will be useful in areas with limited infrastructure support.

Here, HD map applications are evolved from full reliance on the cloud to more distribution across the edge nodes, road side units, and vehicles. This may be accomplished via an HD map distribution framework that uses both the centralized cloud architecture and a distributed ICN architecture that strengthens reliability and also enhances the capabilities of the information or services that may be offered based on the HD maps.

In an example, the process may be outlined as using ordinary crowdsourcing and tile distribution in the cloud-based manner as a baseline. Thus, the traditional techniques are used to download the bulk of the map tile data and upload the map tile updates. Continuous crowdsourcing is added to expand the map tiles coverage. However, the vehicle may still engage in progressive download of map tiles from the cloud every per few kilometers to ensure that the vehicle has baseline HD map information.

Once a vehicle downloads a defined set (e.g., specified number) of tiles, the vehicle stores them locally using a name-based protocol. In an example, the storage persists until the tiles are consumed. For example, when the vehicle drives into and leaves a road segment corresponding to the tile, the tile is consumed. The vehicle may store the tiles for a configurable amount of time even after the vehicle covers the corresponding road segment. In an example, vehicles traveling in the opposite direction as the vehicle and approaching the same road segment may retrieve these tiles from the vehicle before the tiles are discarded.

When another vehicle, in the same road segment, starts to download new tiles, the other vehicle may first send an ICN request for the desired tile (operation 1 in FIG. 4). If the vehicle has matching tiles with names matching those of the requested tiles, the vehicle distributes the tiles to the requesting vehicles directly (e.g., using Vehicle to Vehicle (V2V) communication rather than going to the cloud) and the vehicle replies by an ICN response to the request (operation 3).

While the vehicle has the tiles, the vehicle may augment or update the tiles it holds with data from the vehicle's sensors (operation 2). Then, as noted above, the map tiles held by the vehicle may be shared directly with other near-by vehicles (operation 3).

There may be some issues in ICN-based content retrieval, such as multiple responses with redundant content, responses with different content-ages, content-quality-of-service (QoS) differences, etc. For example, if other vehicles have the same tiles available, the requesting vehicle may receive multiple responses. This may be controlled using existing ICN request or response suppression techniques. However, eliminating redundancy completely may be a mistake because observations from multiple nearby vehicles may be exploited to determine the correctness of reported information specific to a tile.

If a vehicle cannot find (e.g., does not get responses) named tiles from its peers, the vehicle may gracefully fallback to requesting the data from the cloud. In an example, edge nodes or RSUs may contribute to the HD map content naming and named-based distribution of HD maps tiles. Thus, RSUs or other infrastructure components may continually transmit interests to obtain updated map tiles from passing vehicles and serves these to other vehicles. Thus, in an example, these infrastructure components may locally cache HD map tiles for road segments in the vicinity.

Map tile naming may be an important aspect of efficiently distributing the tiles via the ICN. For example, tiles may be named differently depending on what captured the data, or how the tile is being used. Thus, two vehicle systems that want the same data, may fall back on the cloud because they use different names for the same data.

Generally, the cloud-based map tile delivery uses various APIs that function as a query and response mechanism by which HD map applications in a vehicle request the next map tile. The APIs often allow the query to specify the location of the map tiles and other information—e.g., metadata such as type of map, zoom level, size, version number, etc.—when interacting with the cloud.

If the HD Map tiles followed a specific naming convention, then name-based content fetching would prove to be more efficient than the alternatives. This efficiency result from taking advantage of a large number of nodes that serve as content stores in a peer-to-peer network. Thus, the following represent example naming conventions that may be used for the HD map tiles.

In an example, the namespace may be based on existing map query architectures. Thus, here, the map tile naming is guided by existing APIs that enable one to indicate the specific tiles that are requested. For example, the namespace may be constructed using a concatenation of the same parameters that are currently used to locate the correct map tile by the cloud system. For example, such parameters may include bounding box parameters as specified by the OpenStreetMapAPI, where the bounding box parameters are organized such as to uniquely bound a specific region based on directions north, south, east, and west, and on longitudes and latitudes. The following is an example of such a query:

Get/api/0.6/map?bbox=(left,bottom,right,top)

The following is another example of a map query based on the HERE map API:

```
https://{1-4}base.maps.api.here.com
/maptile/2.1/maptile/{map
id}/{scheme}/{zoom}/{column}/{row}/{size}/{format}/
{quality}
```

Based on these examples, the namespace may be arranged as a concatenation of the existing query parameters—where the sequence of parameters could be dictated through how the queries themselves are structured—as follows:

/APIname/VerNo/Parameters/

An example of which is:

/OpenStreetMapAPI/VerNo/left/bottom/right/top.

In an example, the namespace is arranged as a hierarchical space, where the name maps to the specific geographical location, but the attributes of the map are part of the metadata. In an example, a name or query parameter may also include certain quality requirements for each tile. Depending on the sensing range and angle of sensors, various vehicles may detect the same object with a different confidence level. This parameter suppresses the reporting of dynamic objects, for example, unless the vehicle detects the object with a confidence equal to or greater than the quality requirement. In an example, vehicles may report partial (e.g., a certain percentage such as 25%) tiles (e.g., sub-tiles). In an example, approximate name matching may be used to identify partial tiles. In an example, the requesting vehicle may merge partial tiles together, or with full tiles, and may fall back to the cloud if some data is still missing are still missing.

In an example, tile naming may be mapped to a globally unique flat space identifier. Thus, an application-level content query is translated to a globally unique flat namespace identifier space in a globally distributed database that may be looked up using the identifier name by an ICN node. An example of the query above and its flat namespace mapping is shown below:

```
Application query: Get
/api/0.6/map?bbox=(left,bottom,right,top)
```

Here, the query is sent to the ICN layer, where the data request is mapped to a flat space name identifier using a lookup of a global name service table, similar to that of the MobilityFirst architecture. When the request for this name is put in an ICN interest packet, the next node may look up the content based on the unique flat identifier name and, if found, return the content.

Figure 5:
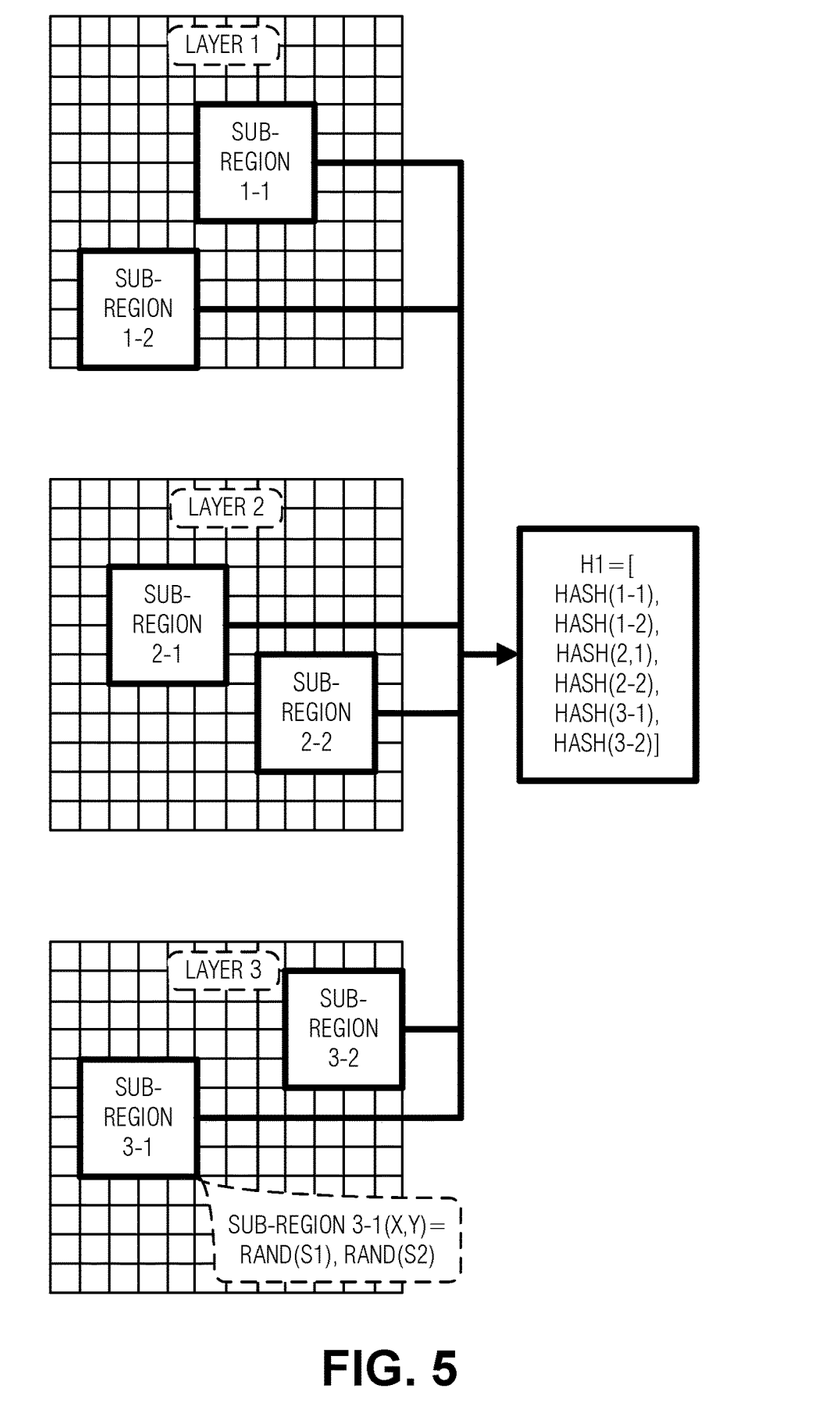
FIG. 5 illustrates an example of using randomly hashed sub-regions of HD maps to verify crowdsourced HD map tiles by a cloud service, according to an embodiment.

FIG. 5 illustrates an example of using randomly hashed sub-regions of HD maps to verify crowdsourced HD map tiles by a cloud service, according to an embodiment. Crowdsourced maps may be faked by unauthenticated (e.g., anonymous) peers. Authenticating peers that dynamically enter or exit the region of interest (ROI) is problematic because of these dynamics. Use of a common group credential associated with an ROI is subject to similar dynamics of a driver having to join an ROI group repeatedly as a vehicle traverses a route. This may be further complicated by a vehicle needing to leave groups to recover resources.

To address these issues the existing cloud connection that possesses authorized HD maps may be used for authentication without downloading map content. Rather, a randomly selected sub-region of a crowdsourced HD map tile is selected for hash computation. The map coordinates for the selected tile and sub-region, the hash value, and hash algorithm are securely sent to the cloud service for validation. The cloud service computes a hash over the same region using the authorized (e.g., vetted) HD map source. If the two hash values are the same, then the cloud service returns TRUE. If they differ, FALSE is returned. The vehicle may opt to download the cloud version of the HD map if discrepancies exist between cloud and crowdsourced versions. The vehicle may opt to select multiple sub-regions to check to rule out anomalies. The vehicle may further opt to select sub-regions from each layer of the HD maps.

In the example illustrated in FIG. 5, the H1 hash computation is made using six sub-regions taken across three HD map layers. H1 may then be compared to an H2 hash computation using the same six sub-regions from the cloud service provider. If H1 is the same as H2, then the crowdsourced maps are authenticated. This technique uses much less bandwidth between the vehicles and the cloud than if full HD maps were downloaded each time.

Figure 6:
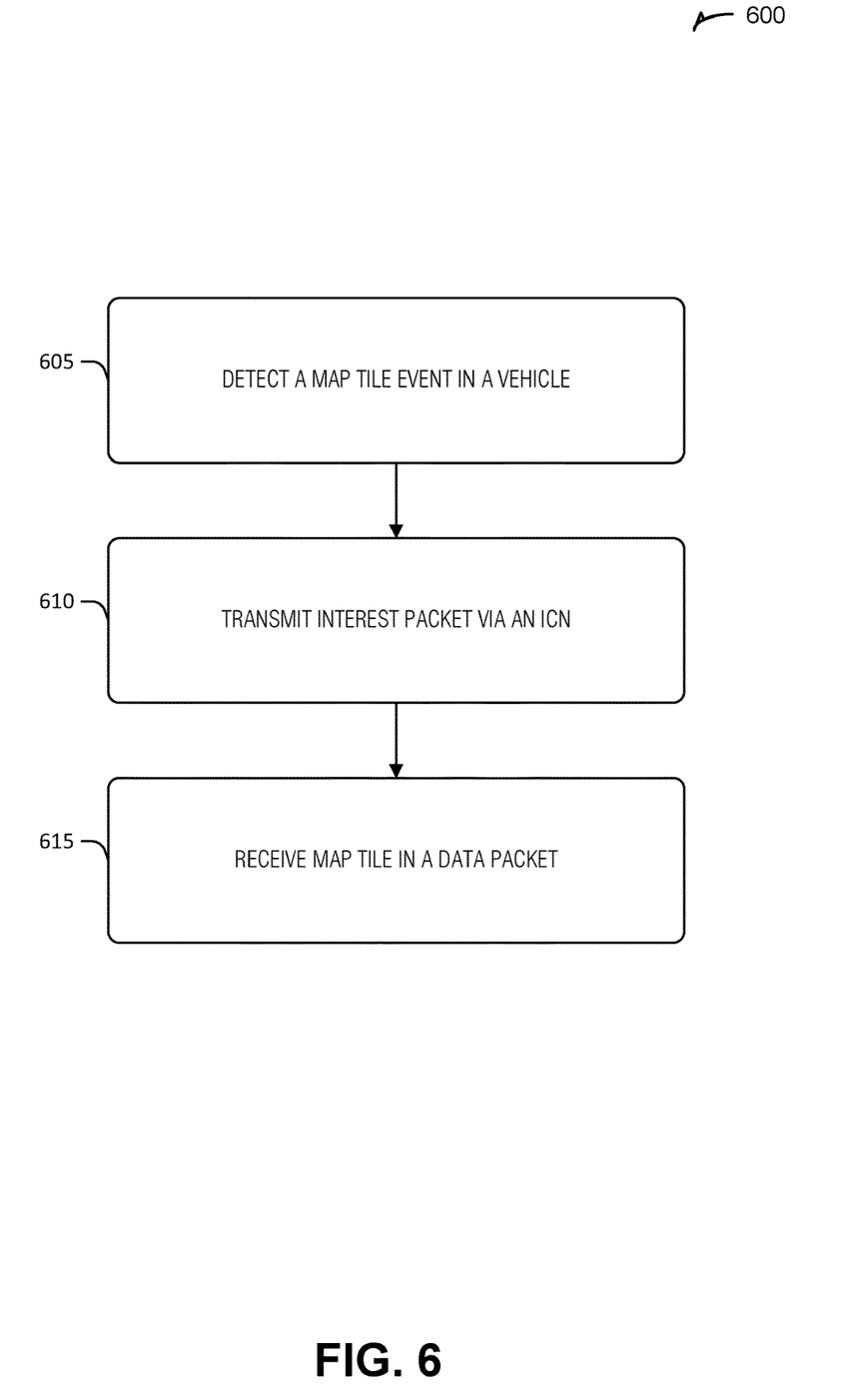
FIG. 6 is an example of a method for ICN approximate calculation caching, according to an embodiment.

FIG. 6 is an example of a method for ICN approximate calculation caching, according to an embodiment. The operations of the method 600 are implemented in computing hardware, such as that described in FIG. 7 or 8 (e.g., processing circuitry).

At operation 605, an event for a map tile is detected. A map tile event is a triggering condition by which a vehicle, for example, will retrieve the map tile or get an update to the map tile. For example, a moving vehicle is entering an area that the map tile covers. Here, the vehicle may not have the map tile or the vehicle may have an out-of-date version of the map tile. In either case, the vehicle will act to correct is data.

At operation 610, an interest packet with a name for the map tile is transmitted via an ICN. In an example, the name for the map tile corresponds to an application programming interface call to a cloud service. As noted above, such a naming convention fits nicely in with existing HD map tile frameworks as the API call is likely already supported by the various machine requesting the map tile. However, being an ICN communication, the tile needs to be named. By using the API call as a string, the same selection criteria used in the API also uniquely identify the map tile.

In an example, the name for the map tile corresponds to a globally unique flat space identifier. Here, a registration service maintains unique identifiers for the map tiles. These may correspond with a physical location, such as grid coordinates, or they may be arbitrary. In either case, the tile is uniquely named. An advantage to this technique may include avoiding duplicate map tile caching at, for example, vehicles or RSUs.

At operation 615, the map tile is received in a data packet sent in response to the interest packet. In an example, the data packet is sent from another vehicle or infrastructure unit within a specified distance of a road segment to which the map tile corresponds. Here, the specified distance may be managed by, for example, a hop count, restricting how many devices the interest may pass. Other distance management techniques may include limiting the transmission to a radio broadcast, such that only devices receiving the broadcast will respond. This sort of communication provides maximum locality for transient activities, such as a school bus stopping, or a roadway spill.

In an example, the method 600 may be extended to include updating the map tile with sensor data from the vehicle. Thus, in this form, the vehicle is performing the first portion of crowdsourced HD map tiles. In an example, the vehicle may receive a second interest packet with the name for the map tile and provide the map tile with updates in a data packet via the ICN. Here, the vehicle re-shares its updates with its peers.

In an example, the method 600 may be extended to include selecting a sub-segment of the map tile and hashing the sub-segment to create a hash value. The sub-segment selection (e.g., via an identifier or other code) and the hash value may then be transmitted to an authenticator, such as the cloud service underlying the map tiles, or another trusted party. The authenticator has a copy of the map tiles and uses the sub-segment selection to locate the same sub-segments hashed by the vehicle. The authenticator then computes the hash value and compares its hash value to that transmitted by the vehicle. If the hash values match, then the map tile received by the vehicle in the data packet is valid. If the hash values do not match, then the map tile is not valid. The authenticator may communicate this result in a number of ways, including simply providing a true or false message back to the vehicle.

The examples above focused on the retrieval of map tiles from peer vehicles or infrastructure units, the updating of these tiles, and the re-sharing of the tiles (e.g., with updates) back to the vehicle's peers. As noted above, however, the crowdsourced updates may also be shared with the cloud service backing the map tiles so that they may be shared to a broader audience. Further, in an example, if the interest packet was not answered, or answered with insufficient data (e.g., a partial tile), the vehicle may fall back to the cloud to retrieve the remaining data.

Figure 7:
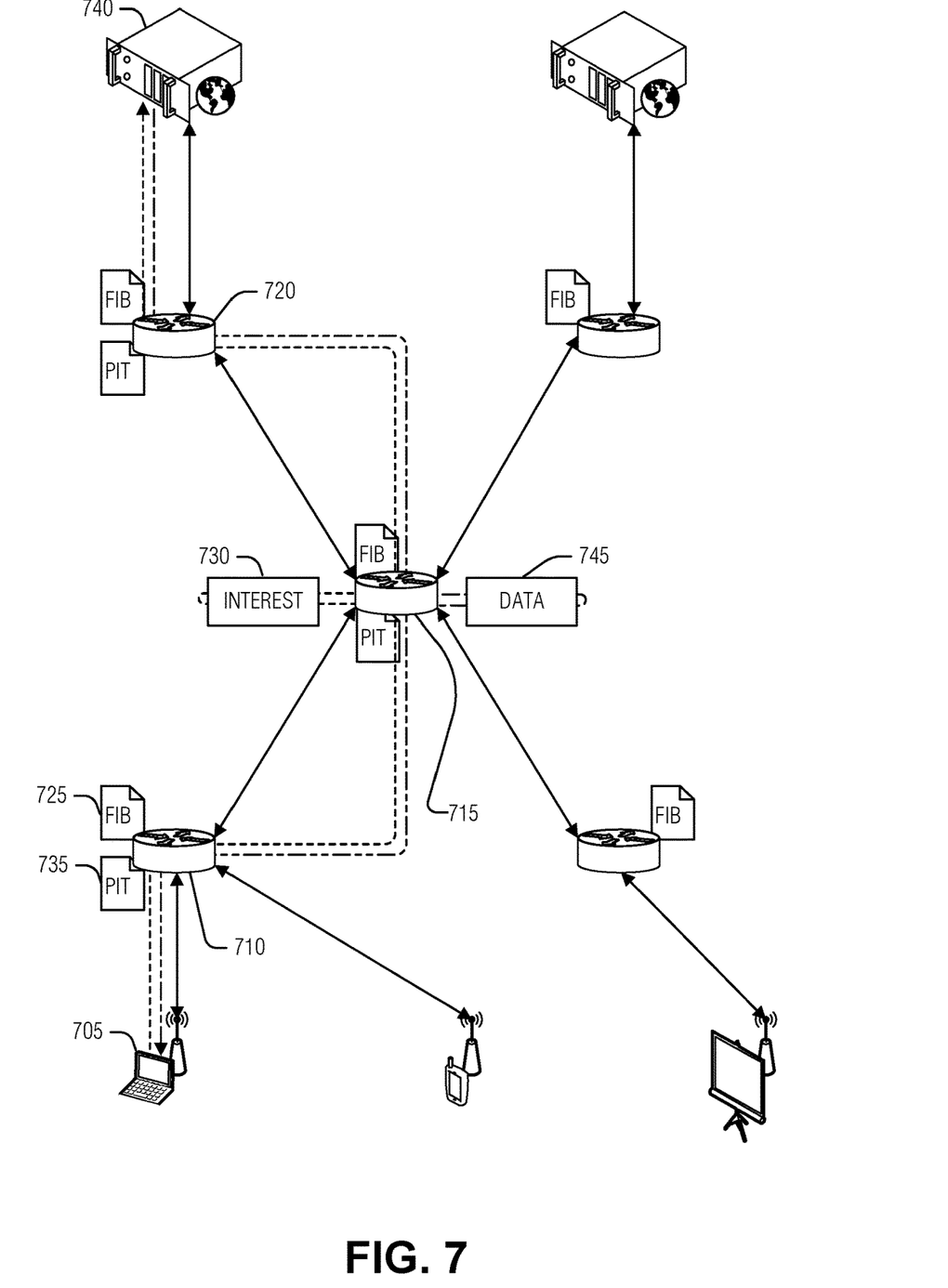
FIG. 7 illustrates an example ICN, according to an embodiment.
Figure 8:
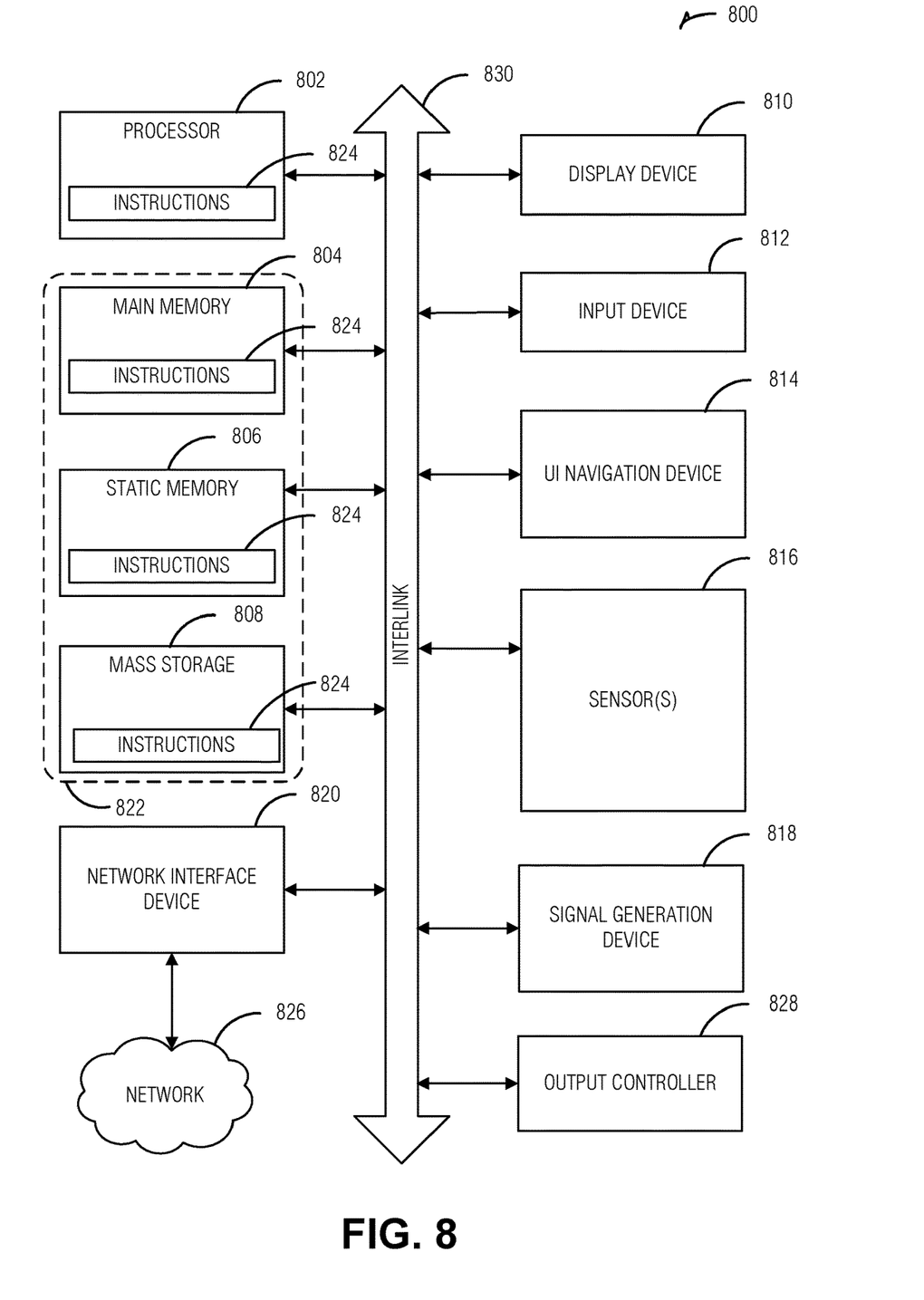
FIG. 8 is a block diagram illustrating an example of a machine upon which one or more embodiments may be implemented.

FIGS. 7 and 8 below provide additional details of the components in FIG. 1. For example, FIG. 7 illustrates several details and variations in ICNs. FIG. 8 illustrates several examples of computer hardware that may be used to implement any of the components illustrated in FIG. 1.

FIG. 7 illustrates an example ICN, according to an embodiment. ICNs operate differently than traditional host-based (e.g., address-based) communication networks. ICN is an umbrella term for a networking paradigm in which information itself is named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 705 (e.g., subscriber) requests named content from the network itself. The content request may be called an interest and transmitted via an interest packet 730. As the interest packet traverses network devices (e.g., network elements, routers, switches, hubs, etc.)—such as network elements 710, 715, and 720—a record of the interest is kept, for example, in a pending interest table (PIT) at each network element. Thus, network element 710 maintains an entry in its PIT 735 for the interest packet 730, network element 715 maintains the entry in its PIT, and network element 720 maintains the entry in its PIT.

When a device, such as publisher 740, that has content matching the name in the interest packet 730 is encountered, that device 740 may send a data packet 745 in response to the interest packet 730. Typically, the data packet 745 is tracked back through the network to the source (e.g., device 705) by following the traces of the interest packet 730 left in the network element PITs. Thus, the PIT 735 at each network element establishes a trail back to the subscriber 705 for the data packet 745 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 730 traverses the ICN, ICN network elements will generally attempt to match the name to a greatest degree. Thus, if an ICN element has a cached item or route for both "www-.somedomain.com or videos" and "www.somedomain.com or videos or v8675309," the ICN element will match the later for an interest packet 730 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 730 to data cached in the ICN element. Thus, for example, if the data 745 named in the interest 730 is cached in network element 715, then the network element 715 will return the data 745 to the subscriber 705 via the network element 710. However, if the data 745 is not cached at network element 715, the network element 715 routes the interest 730 on (e.g., to network element 720). To facilitate routing, the network elements may use a forwarding information base 725 (FIB) to match named data to an interface (e.g., physical port) for the route. Thus, the FIB 725 operates much like a routing table on a traditional network device.

In an example, additional meta-data may be attached to the interest packet 730, the cached data, or the route (e.g., in the FIB 725), to provide an additional level of matching. For example, the data name may be specified as "www.somedomain.com or videos or v8675309," but also include a version number—or timestamp, time range, endorsement, etc. In this example, the interest packet 730 may specify the desired name, the version number, or the version range. The matching may then locate routes or cached data matching the name and perform the additional comparison of meta-data or the like to arrive at an ultimate decision as to whether data or a route matches the interest packet 730 for respectively responding to the interest packet 730 with the data packet 745 or forwarding the interest packet 730.

ICN has advantages over host-based networking because the data segments are individually named. This enables aggressive caching throughout the network as a network element may provide a data packet 730 in response to an interest 730 as easily as an original author 740. Accordingly, it is less likely that the same segment of the network will transmit duplicates of the same data requested by different devices.

Fine grained encryption is another feature of many ICN networks. A typical data packet 745 includes a name for the data that matches the name in the interest packet 730. Further, the data packet 745 includes the requested data and may include additional information to filter similarly named data (e.g., by creation time, expiration time, version, etc.). To address malicious entities providing false information under the same name, the data packet 745 may also encrypt its contents with a publisher key or provide a cryptographic hash of the data and the name. Thus, knowing the key (e.g., from a certificate of an expected publisher 740) enables the recipient to ascertain whether the data is from that publisher 740. This technique also facilitates the aggressive caching of the data packets 745 throughout the network because each data packet 745 is self-contained and secure. In contrast, many host-based networks rely on encrypting a connection between two hosts to secure communications. This may increase latencies while connections are being established and prevents data caching by hiding the data from the network elements.

Example ICN networks include: content centric networking (CCN)—as specified in the Internet Engineering Task Force (IETF) draft specifications for CCNx 0.x and CCN 1.x; named data networking (NDN)—as specified in the NDN technical report DND-0001; Data-Oriented Network Architecture (DONA)—as presented at proceedings of the 2007 Association for Computing Machinery's (ACM) Special Interest Group on Data Communications (SIGCOMM) conference on Applications, technologies, architectures, and protocols for computer communications; Named Functions Networking (NFN); 4WARD; Content Aware Searching, Retrieval and Streaming (COAST); Convergence of Fixed and Mobile Broadband Access/Aggregation Networks (COMBO); Content Mediator Architecture for Content-Aware Networks (COMET); CONVERGENCE; GreenICN; Network of Information (NetInf); IP Over ICN (POINT); Publish-Subscribe Internet Routing Paradigm (PSIRP); Publish Subscribe Internet Technology (PURSUIT); Scalable and Adaptive Internet Solutions (SAIL); Universal, Mobile-Centric and Opportunistic Communications Architecture (UMOBILE); among others.

FIG. 8 illustrates a block diagram of an example machine 800 upon which any one or more of the techniques (e.g., methodologies) discussed herein may perform. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise)

that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, optical media, magnetic media, and signals (e.g., radio frequency signals, other photon-based signals, sound signals, etc.). In an example, a non-transitory machine-readable medium comprises a machine-readable medium with a plurality of particles having invariant (e.g., rest) mass, and thus are compositions of matter. Accordingly, non-transitory machine-readable media are machine readable media that do not include transitory propagating signals. Specific examples of non-transitory machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a device mounted in a vehicle for high definition (HD) map distribution in an information centric network (ICN), the device comprising: processing circuitry; and memory including instructions that, when the device is in operation, configure the processing circuitry to: detect an event for a map tile; transmit an interest packet with a name for the map tile via an ICN; and receive the map tile in a data packet sent in response to the interest packet.

In Example 2, the subject matter of Example 1, wherein the event for the map tile is at least one of missing the map tile or the map tile is out-of-date.

In Example 3, the subject matter of Example 2, wherein, to detect the event, the processing circuitry is configured to detect entry into an area that the map tile covers.

In Example 4, the subject matter of any of Examples 1-3, wherein the name for the map tile includes a location of the vehicle.

In Example 5, the subject matter of any of Examples 1-4, wherein the name for the map tile includes an indication of an expected format for the map tile.

In Example 6, the subject matter of any of Examples 1-5, wherein the name for the map tile corresponds to an application programming interface call to a cloud service.

In Example 7, the subject matter of any of Examples 1-6, wherein the name for the map tile corresponds to a globally unique flat space identifier.

In Example 8, the subject matter of any of Examples 1-7, wherein the data packet is sent from another vehicle or infrastructure unit within a specified distance of a road segment to which the map tile corresponds.

In Example 9, the subject matter of Example 8, wherein the ICN includes a vehicle-to-vehicle network, and wherein the vehicle uses an address based-network to communicate with a cloud provider of HD map tiles.

In Example 10, the subject matter of any of Examples 8-9, wherein the instructions configure the processing circuitry to: select a sub-segment of the map tile; hash the sub-segment to create a hash value; and transmitting an identifier of the sub-segment and the hash value to an authenticator, the authenticator configured to: use the identifier to locate the sub-segment in a copy of the map tile held by the authenticator; calculate an authenticator version of the hash value; and return a message to the vehicle to indicate that the map tile received by the vehicle is valid if the authenticator hash value matches the hash value and invalid otherwise.

In Example 11, the subject matter of any of Examples 8-10, wherein the instructions configure the processing circuitry to update the map tile with sensor data from the vehicle.

In Example 12, the subject matter of Example 11, wherein the instructions configure the processing circuitry to: receive a second interest packet with the name for the map tile; and provide the map tile with updates in a data packet via the ICN.

Example 13 is a method for high definition (HD) map distribution in an information centric network (ICN), the method comprising: detecting, by a moving vehicle, an event for a map tile; transmitting an interest packet with a name for the map tile via an ICN; and receiving the map tile in a data packet sent in response to the interest packet.

In Example 14, the subject matter of Example 13, wherein the event for the map tile is at least one of missing the map tile or the map tile is out-of-date.

In Example 15, the subject matter of Example 14, wherein detecting the event includes entering an area that the map tile covers.

In Example 16, the subject matter of any of Examples 13-15, wherein the name for the map tile includes a location of the vehicle.

In Example 17, the subject matter of any of Examples 13-16, wherein the name for the map tile includes an indication of an expected format for the map tile.

In Example 18, the subject matter of any of Examples 13-17, wherein the name for the map tile corresponds to an application programming interface call to a cloud service.

In Example 19, the subject matter of any of Examples 13-18, wherein the name for the map tile corresponds to a globally unique flat space identifier.

In Example 20, the subject matter of any of Examples 13-19, wherein the data packet is sent from another vehicle or infrastructure unit within a specified distance of a road segment to which the map tile corresponds.

In Example 21, the subject matter of Example 20, wherein the ICN includes a vehicle-to-vehicle network, and wherein the vehicle uses an address based-network to communicate with a cloud provider of HD map tiles.

In Example 22, the subject matter of any of Examples 20-21, comprising: selecting a sub-segment of the map tile; hashing the sub-segment to create a hash value; and transmitting an identifier of the sub-segment and the hash value to an authenticator, the authenticator configured to: use the identifier to locate the sub-segment in a copy of the map tile held by the authenticator; calculate an authenticator version of the hash value; and return a message to the vehicle to indicate that the map tile received by the vehicle is valid if the authenticator hash value matches the hash value and invalid otherwise.

In Example 23, the subject matter of any of Examples 20-22, comprising updating the map tile with sensor data from the vehicle.

In Example 24, the subject matter of Example 23, comprising: receiving a second interest packet with the name for the map tile; and providing the map tile with updates in a data packet via the ICN.

Example 25 is at least one machine-readable medium including instructions for high definition (HD) map distribution in an information centric network (ICN), the instructions, when executed by processing circuitry, cause the processing circuitry to perform operations comprising: detecting, by a moving vehicle, an event for a map tile; transmitting an interest packet with a name for the map tile via an ICN; and receiving the map tile in a data packet sent in response to the interest packet.

In Example 26, the subject matter of Example 25, wherein the event for the map tile is at least one of missing the map tile or the map tile is out-of-date.

In Example 27, the subject matter of Example 26, wherein detecting the event includes entering an area that the map tile covers.

In Example 28, the subject matter of any of Examples 25-27, wherein the name for the map tile includes a location of the vehicle.

In Example 29, the subject matter of any of Examples 25-28, wherein the name for the map tile includes an indication of an expected format for the map tile.

In Example 30, the subject matter of any of Examples 25-29, wherein the name for the map tile corresponds to an application programming interface call to a cloud service.

In Example 31, the subject matter of any of Examples 25-30, wherein the name for the map tile corresponds to a globally unique flat space identifier.

In Example 32, the subject matter of any of Examples 25-31, wherein the data packet is sent from another vehicle or infrastructure unit within a specified distance of a road segment to which the map tile corresponds.

In Example 33, the subject matter of Example 32, wherein the ICN includes a vehicle-to-vehicle network, and wherein the vehicle uses an address based-network to communicate with a cloud provider of HD map tiles.

In Example 34, the subject matter of any of Examples 32-33, wherein the operations comprise: selecting a sub-segment of the map tile; hashing the sub-segment to create a hash value; and transmitting an identifier of the sub-segment and the hash value to an authenticator, the authenticator configured to: use the identifier to locate the sub-segment in a copy of the map tile held by the authenticator; calculate an authenticator version of the hash value; and return a message to the vehicle to indicate that the map tile received by the vehicle is valid if the authenticator hash value matches the hash value and invalid otherwise.

In Example 35, the subject matter of any of Examples 32-34, wherein the operations comprise updating the map tile with sensor data from the vehicle.

In Example 36, the subject matter of Example 35, wherein the operations comprise: receiving a second interest packet with the name for the map tile; and providing the map tile with updates in a data packet via the ICN.

Example 37 is a system for high definition (HD) map distribution in an information centric network (ICN), the system comprising: means for detecting, by a moving vehicle, an event for a map tile; means for transmitting an interest packet with a name for the map tile via an ICN; and means for receiving the map tile in a data packet sent in response to the interest packet.

In Example 38, the subject matter of Example 37, wherein the event for the map tile is at least one of missing the map tile or the map tile is out-of-date.

In Example 39, the subject matter of Example 38, wherein the means for detecting the event include means for entering an area that the map tile covers.

In Example 40, the subject matter of any of Examples 37-39, wherein the name for the map tile includes a location of the vehicle.

In Example 41, the subject matter of any of Examples 37-40, wherein the name for the map tile includes an indication of an expected format for the map tile.

In Example 42, the subject matter of any of Examples 37-41, wherein the name for the map tile corresponds to an application programming interface call to a cloud service.

In Example 43, the subject matter of any of Examples 37-42, wherein the name for the map tile corresponds to a globally unique flat space identifier.

In Example 44, the subject matter of any of Examples 37-43, wherein the data packet is sent from another vehicle or infrastructure unit within a specified distance of a road segment to which the map tile corresponds.

In Example 45, the subject matter of Example 44, wherein the ICN includes a vehicle-to-vehicle network, and wherein the vehicle uses an address based-network to communicate with a cloud provider of HD map tiles.

In Example 46, the subject matter of any of Examples 44-45, comprising: means for selecting a sub-segment of the map tile; means for hashing the sub-segment to create a hash value; and means for transmitting an identifier of the sub-segment and the hash value to an authenticator, the authenticator configured to: use the identifier to locate the sub-segment in a copy of the map tile held by the authenticator; calculate an authenticator version of the hash value; and means for return a message to the vehicle to indicate that the map tile received by the vehicle is valid if the authenticator hash value matches the hash value and invalid otherwise.

In Example 47, the subject matter of any of Examples 44-46, comprising means for updating the map tile with sensor data from the vehicle.

In Example 48, the subject matter of Example 47, comprising: means for receiving a second interest packet with the name for the map tile; and means for providing the map tile with updates in a data packet via the ICN.

Example 49 is at least one machine-readable medium including instructions that, when executed by processing circuitry, cause the processing circuitry to perform operations to implement of any of Examples 1-48.

Example 50 is an apparatus comprising means to implement of any of Examples 1-48.

Example 51 is a system to implement of any of Examples 1-48.

Example 52 is a method to implement of any of Examples 1-48.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A device mounted in a vehicle for high definition (HD) map distribution in an information centric network (ICN), the device comprising:
   processing circuitry; and
   memory including instructions that, when the device is in operation, configure the processing circuitry to:
   detect an event for a map tile;
   transmit an interest packet with a name for the map tile via an ICN;
   receive the map tile in a data packet sent in response to the interest packet,
   wherein the data packet is sent from another vehicle or infrastructure unit within a specified distance of a road segment to which the map tile corresponds;

select a sub-segment of the map tile;
hash the sub-segment to create a hash value; and
transmit an identifier of the sub-segment and the hash value to an authenticator, the authenticator to:
use the identifier to locate the sub-segment in a copy of the map tile held by the authenticator;
calculate an authenticator version of the hash value; and
return a message to the device to indicate that the map tile received by the device is valid if the authenticator hash value matches the hash value and invalid otherwise.

2. The device of claim 1, wherein the name for the map tile includes a location of the vehicle.

3. The device of claim 1, wherein the name for the map tile corresponds to an application programming interface call to a cloud service.

4. The device of claim 1, wherein the ICN includes a vehicle-to-vehicle network, and wherein the vehicle uses an address based-network to communicate with a cloud provider of HD map tiles.

5. The device of claim 1, wherein the instructions configure the processing circuitry to update the map tile with sensor data from the vehicle.

6. The device of claim 5, wherein the instructions configure the processing circuitry to:
receive a second interest packet with the name for the map tile; and
provide the map tile with updates in a data packet via the ICN.

7. A method for high definition (HD) map distribution in an information centric network (ICN), the method comprising:
detecting, by a moving vehicle, an event for a map tile;
transmitting an interest packet with a name for the map tile via an ICN;
receiving the map tile in a data packet sent in response to the interest packet, wherein the data packet is sent from another vehicle or infrastructure unit within a specified distance of a road segment to which the map tile corresponds;
selecting a sub-segment of the map tile;
hashing the sub-segment to create a hash value; and
transmitting an identifier of the sub-segment and the hash value to an authenticator, the authenticator to:
use the identifier to locate the sub-segment in a copy of the map tile held by the authenticator;
calculate an authenticator version of the hash value; and
return a message to the vehicle to indicate that the map tile received by the vehicle is valid if the authenticator hash value matches the hash value and invalid otherwise.

8. The method of claim 7, wherein the name for the map tile includes a location of the vehicle.

9. The method of claim 7, wherein the name for the map tile corresponds to an application programming interface call to a cloud service.

10. The method of claim 7, wherein the ICN includes a vehicle-to-vehicle network, and wherein the vehicle uses an address based-network to communicate with a cloud provider of HD map tiles.

11. The method of claim 7, comprising updating the map tile with sensor data from the vehicle.

12. The method of claim 11, comprising:
receiving a second interest packet with the name for the map tile; and
providing the map tile with updates in a data packet via the ICN.

13. At least one non-transitory machine-readable medium including instructions for high definition (HD) map distribution in an information centric network (ICN), the instructions, when executed by processing circuitry, cause the processing circuitry to perform operations comprising:
detecting, by a moving vehicle, an event for a map tile;
transmitting an interest packet with a name for the map tile via an ICN;
receiving the map tile in a data packet sent in response to the interest packet, wherein the data packet is sent from another vehicle or infrastructure unit within a specified distance of a road segment to which the map tile corresponds;
selecting a sub-segment of the map tile;
hashing the sub-segment to create a hash value; and
transmitting an identifier of the sub-segment and the hash value to an authenticator, the authenticator configured to:
use the identifier to locate the sub-segment in a copy of the map tile held by the authenticator;
calculate an authenticator version of the hash value; and
return a message to the vehicle to indicate that the map tile received by the vehicle is valid if the authenticator hash value matches the hash value and invalid otherwise.

14. The at least one machine-readable medium of claim 13, wherein the name for the map tile includes a location of the vehicle.

15. The at least one machine-readable medium of claim 13, wherein the name for the map tile corresponds to an application programming interface call to a cloud service.

16. The at least one machine-readable medium of claim 13, wherein the ICN includes a vehicle-to-vehicle network, and wherein the vehicle uses an address based-network to communicate with a cloud provider of HD map tiles.

17. The at least one machine-readable medium of claim 13, wherein the operations comprise updating the map tile with sensor data from the vehicle.

18. The at least one machine-readable medium of claim 17, wherein the operations comprise:
receiving a second interest packet with the name for the map tile; and
providing the map tile with updates in a data packet via the ICN.

19. The device of claim 1, wherein the event for the map tile is at least one of missing the map tile, the map tile is out-of-date, or entry into an area that the map tile covers is detected.

20. The device of claim 1, wherein the name for the map tile includes an indication of an expected format for the map tile.

21. The method of claim 7, wherein the event for the map tile is at least one of missing the map tile, the map tile is out-of-date, or entry into an area that the map tile covers is detected.

22. The method of claim 7, wherein the name for the map tile includes an indication of an expected format for the map tile.

23. The at least one machine readable-medium of claim 13, wherein the event for the map tile is at least one of missing the map tile, the map tile is out-of-date, or entry into an area that the map tile covers is detected.

24. The at least one machine readable-medium of claim 13, wherein the name for the map tile includes an indication of an expected forma for the map tile.

\* \* \* \* \*